(12) United States Patent
Amemiya et al.

(10) Patent No.: US 6,473,296 B2
(45) Date of Patent: Oct. 29, 2002

(54) INFORMATION PROCESSING DEVICE

(75) Inventors: Ryoji Amemiya; Shinichi Ogasawara, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/850,453

(22) Filed: May 7, 2001

(65) Prior Publication Data

US 2001/0046116 A1 Nov. 29, 2001

(30) Foreign Application Priority Data

May 9, 2000 (JP) ........................................ 2000-142257

(51) Int. Cl.⁷ ................................................ H05K 5/00
(52) U.S. Cl. ........................... 361/683; 361/740; 70/57; 292/148
(58) Field of Search ................................. 361/683–686, 361/724–727, 740, 759; 364/708.1; 70/58, 57, 85; 292/42, 148, 151, 307 R

(56) References Cited

U.S. PATENT DOCUMENTS

| | | | | |
|---|---|---|---|---|
| 4,984,706 A | * | 1/1991 | Cadwell et al. | 220/334 |
| 6,175,488 B1 | * | 1/2001 | Seto et al. | 361/683 |
| 6,233,138 B1 | * | 5/2001 | Osgood | 361/681 |
| 6,262,885 B1 | * | 7/2001 | Emma et al. | 361/683 |
| 6,310,768 B1 | * | 10/2001 | Kung et al. | 361/681 |

* cited by examiner

*Primary Examiner*—Darren Schuberg
*Assistant Examiner*—Hung Van Duong
(74) *Attorney, Agent, or Firm*—Frommer Lawrence & Haug LLP; William S. Frommer; Matthew K. Ryan

(57) ABSTRACT

An information processing device has a pair of projections joined to a display unit and angularly movable about an axis which is disposed in a position vertically spaced a predetermined distance from a display panel of the display unit, and a pair of supports. The projections are angularly movably supported by the supports such that the axis is positioned within the main unit.

6 Claims, 21 Drawing Sheets

F I G. 19
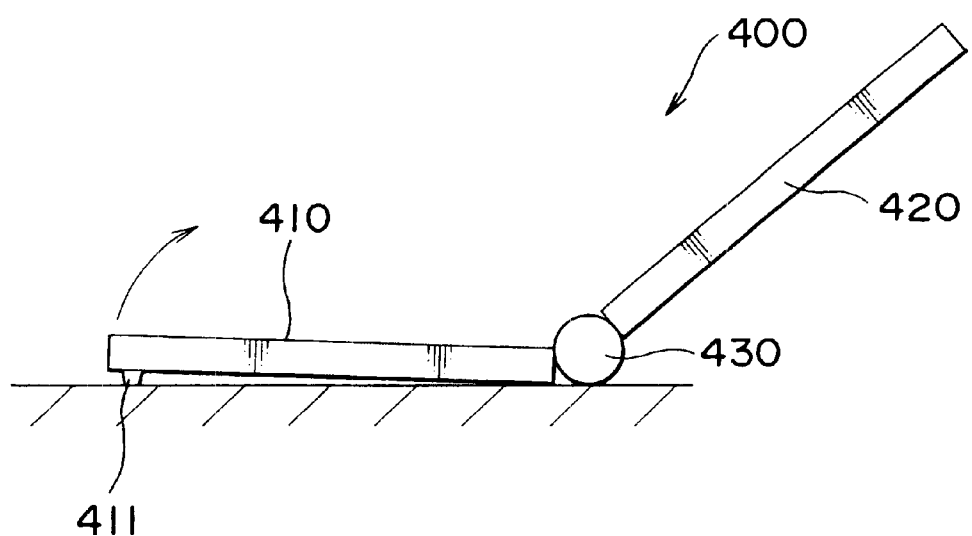

F I G. 29
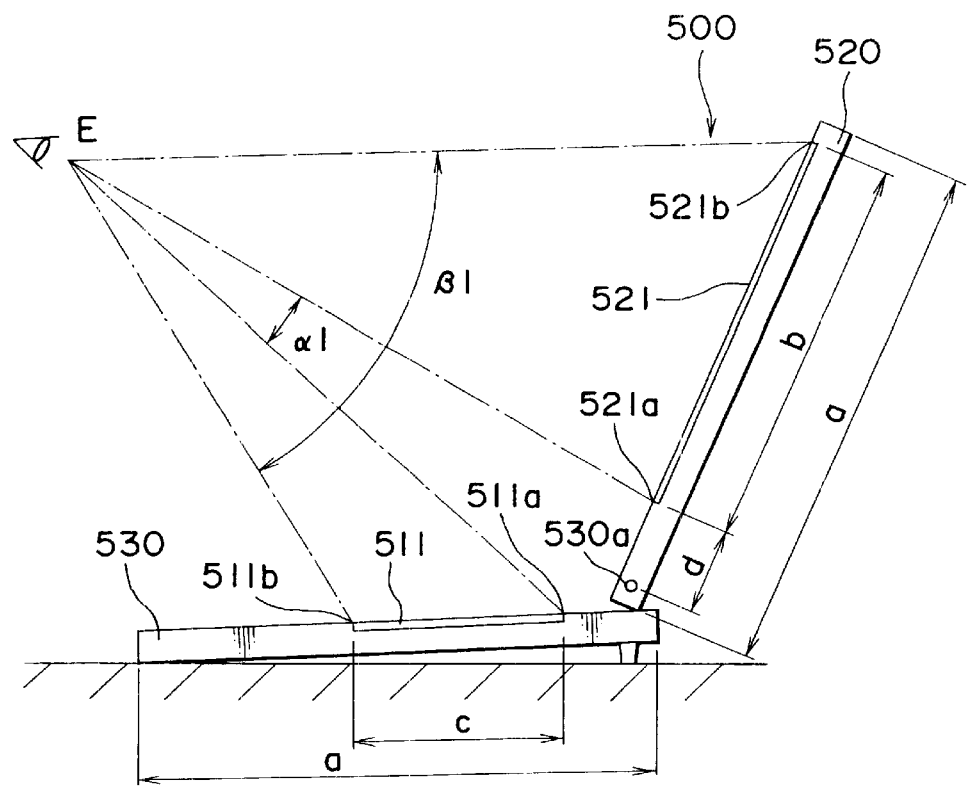
F I G. 30
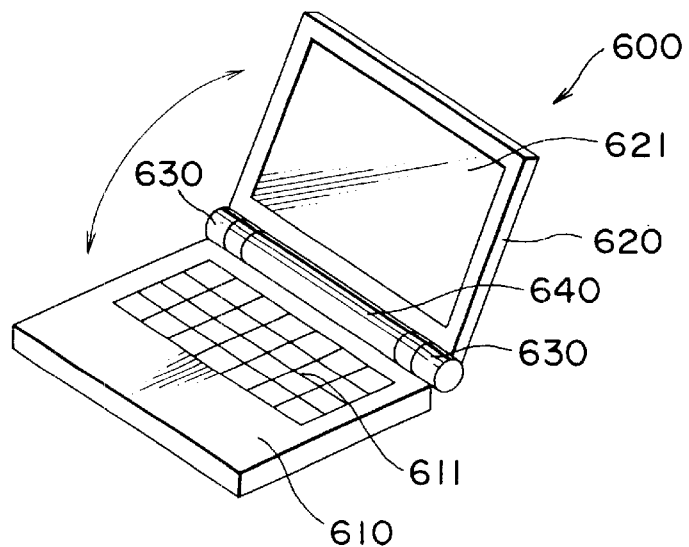

INFORMATION PROCESSING DEVICE

BACKGROUND OF THE INVENTION

The present invention relates to an information processing device having a display unit which is foldable with respect to a main unit.

DESCRIPTION OF THE RELATED ART

In recent years, many portable information processing devices called note-type personal computers or mobile computers are available as products. Such an information processing device has a main unit and a display unit which can be opened and closed with respect to the main unit by hinges.

FIG. 28 is a perspective view of a computer as a conventional information processing device with a display unit opened with respect to a main unit, and FIG. 29 is a side elevational view of the computer.

The computer, denoted by 500, comprises a main unit 510 and a display unit 520 openably and closably attached thereto by a hinge 530. The hinge 530 comprises a projection 531 mounted on a substantially central portion of the main unit 510 and a recess 532 defined in a substantially central portion of the display unit 520 and fitted over the projection 531.

FIG. 30 is a perspective view of another computer as a conventional information processing device with a display unit opened with respect to a main unit, and FIG. 31 is a side elevational view of the computer.

The computer, denoted by 600, comprises a main unit 610 and a display unit 620 openably and closably attached thereto by a pair of hinges 630. A battery pack 640 is detachably disposed between the hinges 630.

When the conventional computers 500, 600 are used on a desktop, the user moves its line of sight between keyboards 511, 611 on the main units 510, 610 and display panels 521, 621 of the display units 520, 620 as shown in FIGS. 29 and 31. It is assumed that the main units 510, 610 and the display units 520, 620 have the same width a, the display panels 521, 621 have the same width b, the keyboards 511, 611 have the same width c, and regions of the display units 520, 620 beneath the display panels 521, 610 where boards can be housed have the same distance d. It is also assumed that a central axis 630a of the hinges 630 is spaced from a lower end 621a of the display panel 621 by a distance d2.

It can be understood that minimum angles $\alpha 1$, $\alpha 2$ through which the user's line of sight moves, i.e., angles formed at the viewpoint E between upper ends 511a, 611a of the keyboards 511, 611 and lower ends 521a, 621a of the display panels 521, 621, and maximum angles $\beta 1$, $\beta 2$ through which the user's line of sight moves, i.e., angles formed at the viewpoint E between lower ends 511b, 611b of the keyboards 511, 611 and upper ends 521b, 621b of the display panels 521, 621 are greatly affected by the relative positional relationship between the central axes 530a, 630a of the hinges 530, 630.

The central axes 530a, 630a of the hinges 530, 630 are disposed outwardly and upwardly of the main units 510, 610 on and parallel to extensions of the display panels 521, 621. The display panels 521, 621 are spaced from the central axes 530a, 630a by the distance d across the regions where the board or the like can be housed. Therefore, both the minimum angles $\alpha 1$, $\alpha 2$ through which the user's line of sight moves and the maximum angles $\beta 1$, $\beta 2$ through which the user's line of sight moves are large. When the user uses the computer over a long period of time, the user tends to suffer from a growing fatigue and the efficiency with which to work with the computers is liable to decrease.

SUMMARY OF THE INVENTION

It is an object of the present invention to provide an information processing device which eliminates the above drawbacks, can easily be used, and can be operated with increased efficiency.

According to the present invention, the above object can be achieved by an information processing device having a main unit for executing a predetermined information processing operation and a display unit openable and closable with respect to the main unit, characterized by a pair of projections joined to the display unit and angularly movable about an axis which is disposed in a position vertically spaced a predetermined distance from a display panel of the display unit, and a pair of supports, the projections being angularly movably supported by the supports such that the axis is positioned within the main unit.

With the above arrangement, since the display unit has a rear portion that is offset from the supports by the length of the projections, a front surface of the rear portion of the display unit is turned along a rear portion of the main unit. Therefore, if the display unit is unfolded to an angle for use, then the rear portion of the display unit is turned over behind the main unit, reducing the distance between the central axis of an opening and closing mechanism and the lower end of the display panel and hence reducing minimum and maximum angles through which the line of sight of the user moves. Consequently, the user is less liable to fatigue from using the information processing device over a long period of time, and the efficiency with which to work with the information processing device increases.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 19 is a perspective view illustrative of problems of the computer shown in FIG. 16;

FIG. 29 is a side elevational view of the computer shown in FIG. 28;

FIG. 30 is a perspective view of another computer as a conventional information processing device with a display unit opened with respect to a main unit.

DETAILED DESCRIPTION OF THE PREFERRED EMBODIMENT

A preferred embodiment of the present invention will hereinafter be described in detail with reference to the drawings.

Since the embodiment which will be described below is a preferred embodiment of the present invention, it is limited by various details that are technically preferable. However, the present invention is not limited to those details unless otherwise specified in the description that follows.

Figure 1:
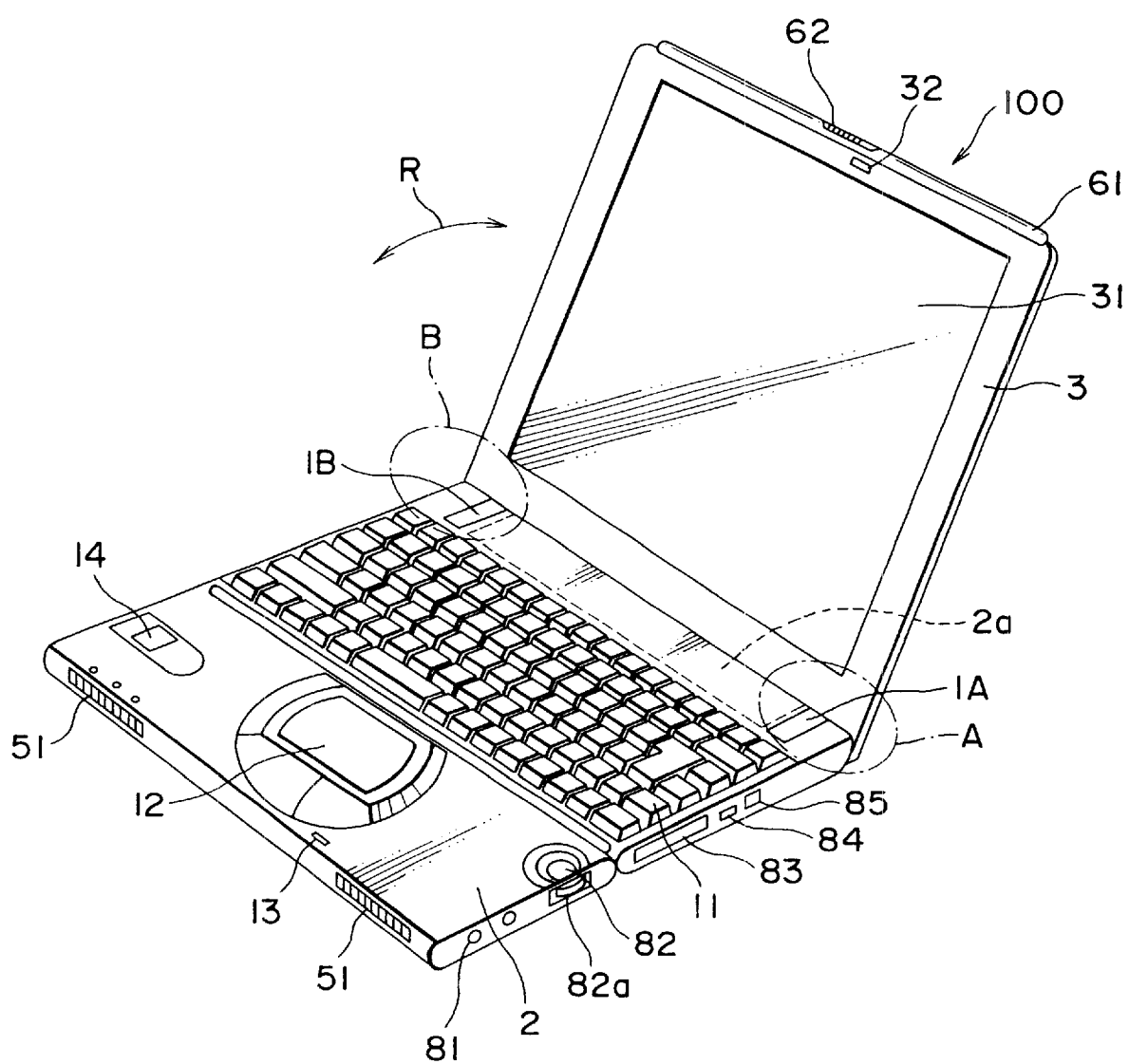
FIG. 1 is a perspective view of a portable computer having a display unit that is openable and closable with respect to a main unit, as an embodiment of an information processing device according to the present invention.
Figure 2:
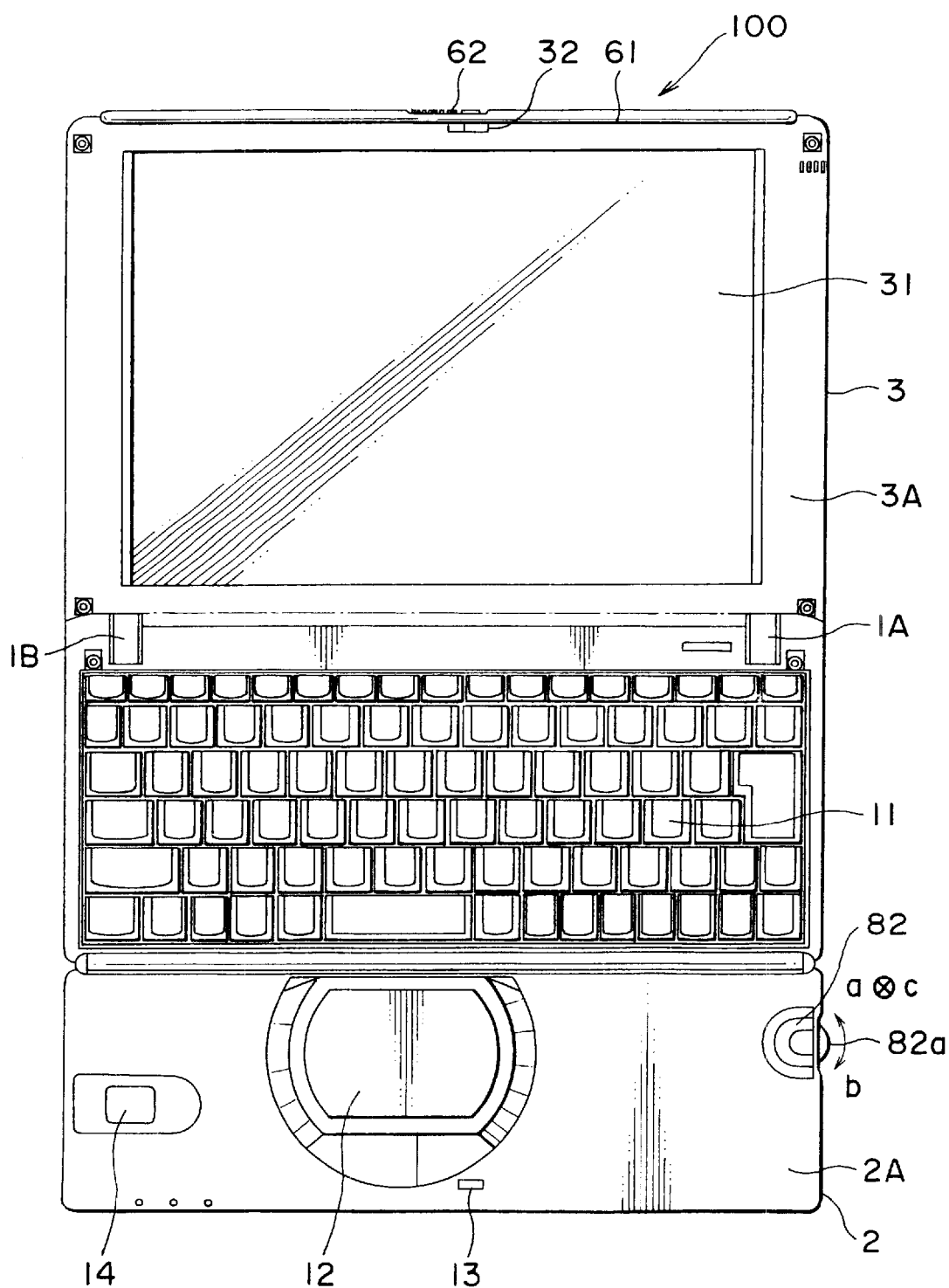
FIG. 2 is a plan view of the computer shown in FIG. 1 with the display unit opened substantially 180 degrees with respect to the main unit.

FIG. 1 is a perspective view of a portable computer having a display unit that is openable and closable with respect to a main unit, as an embodiment of an information processing device according to the present invention. FIG. 2 is a plan view of the computer shown in FIG. 1 with the display unit opened substantially 180 degrees with respect to the main unit, and FIGS. 3 through 8 are a plan view of the computer with the display unit closed with respect to the main unit, as view from the display unit side, a plan view as viewed from the main unit side, a front elevational view, a rear elevational view, a right side elevational view, and a left side elevational view.

The computer, denoted by 100, comprises a main unit 2 and a display unit 3 which are openable and closable (foldable and unfoldable) in the directions indicated by the arrows R by a hinge 1A (first opening and closing mechanism) and a hinge 1B (second opening and closing mechanism), described in detail later, that are enclosed in areas A, B. The computer 100 also has a battery storage region 2a disposed between the hinges 1A, 1B in which a battery pack, described in detail later, can removably be stored. Confronting surfaces of the main unit 2 and the display unit 3 are referred to as upper and front surfaces, respectively, and opposite surfaces of the main unit 2 and the display unit 3 as lower and rear surfaces, respectively.

Figure 4:
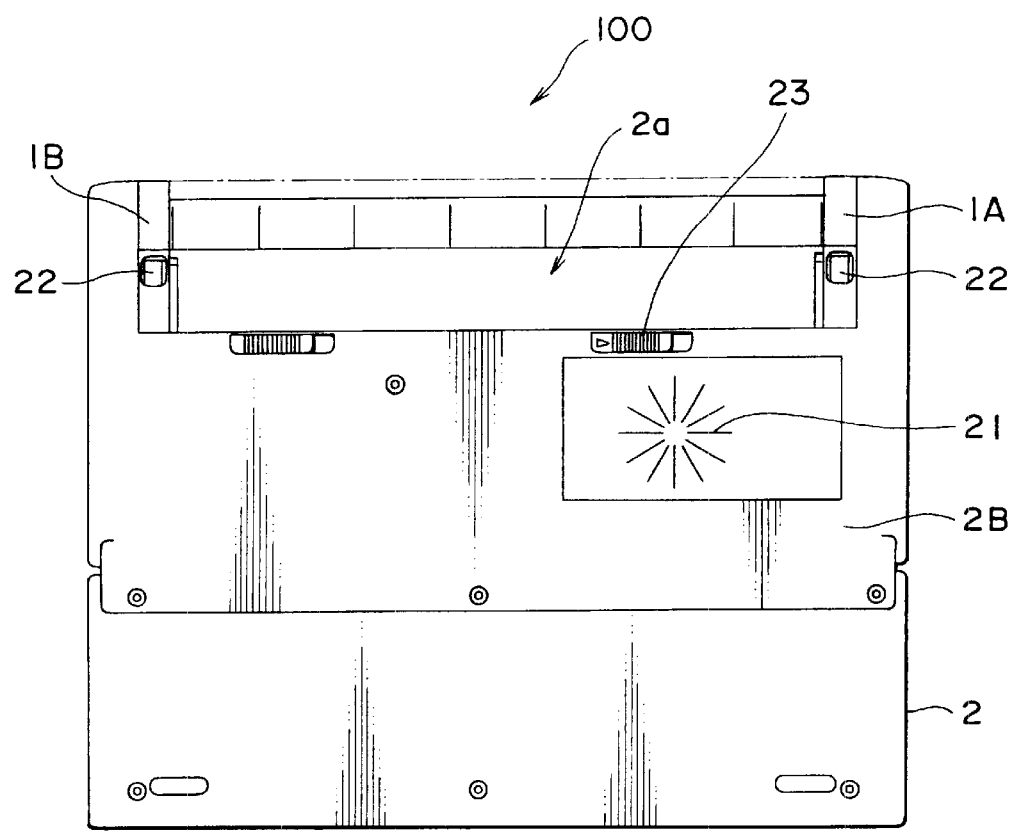
FIG. 4 is a plan view of the computer shown in FIG. 3 as viewed from the main unit side.

As shown in FIGS. 1 and 2, the main unit 2 has a keyboard 11, a pointing device 12, etc. on the upper surface thereof, and covered with a nonmetal casing 2A made of plastics or the like. As shown in FIG. 4, the lower surface of the main unit 2 has an air inlet hole 21 of a cooling fan that is disposed in the main unit 2, a pair of legs 22, and slidable removal levers 23 for removing the battery pack from the battery storage region 2a, and is covered with a metal casing 2B made of magnesium alloy, aluminum alloy, or the like.

Figure 3:
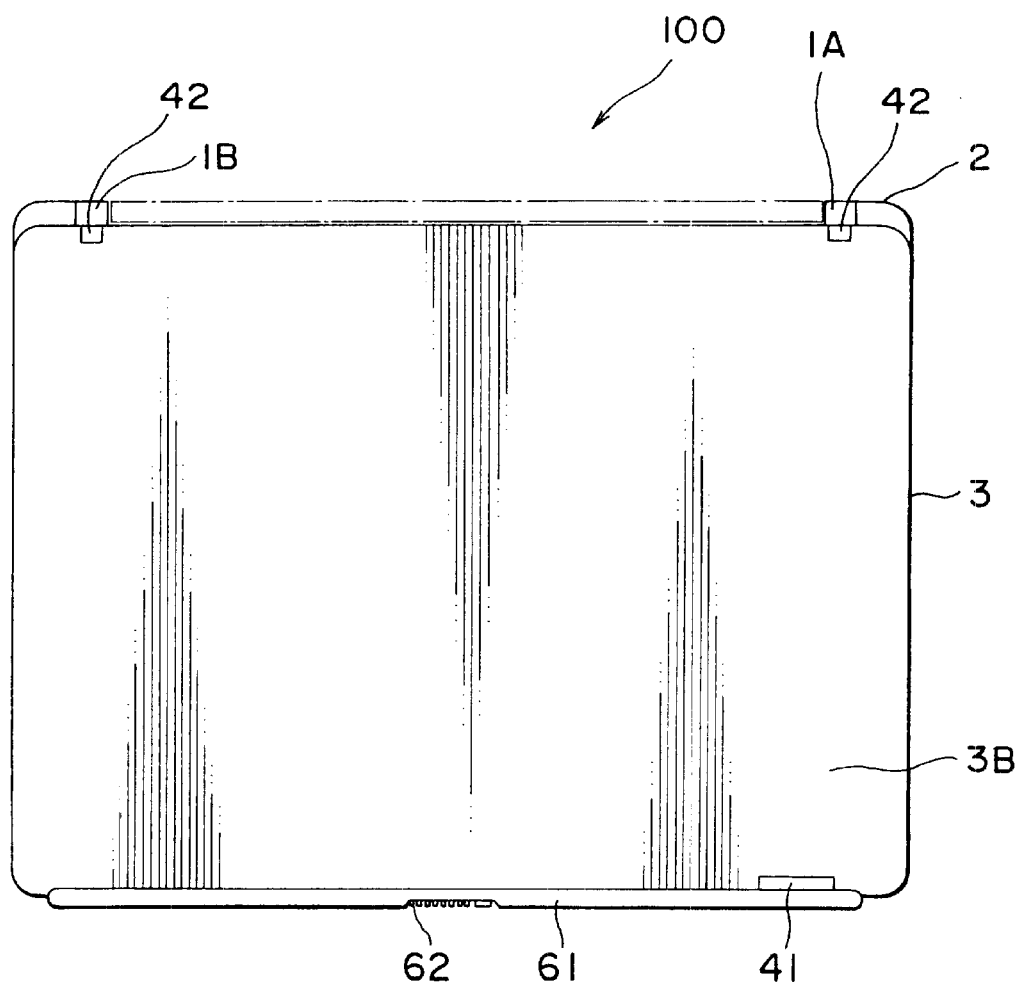
FIG. 3 is a plan view of the computer shown in FIG. 1 with the display unit closed with respect to the main unit as viewed from the display unit side.

As shown in FIGS. 1 and 2, the front surface of the display unit 3 has a liquid crystal display (LCD) 31 or the like, and is covered with a nonmetal casing 3A made of plastics or the like. As shown in FIG. 3, the rear surface of the display unit 3 is covered with a metal casing 3B made of magnesium alloy, aluminum alloy, or the like except an antenna cover 41 which covers an antenna, described in detail later. A pair of protectors 42 is disposed on the rear surface of the display unit 3 near the hinges 1A, 1B, the protectors 42 slightly projecting from the rear surface of the display unit 3 for protecting the end of the display unit 3 against damage due to frictional engagement with the surface of the desktop.

Figure 5:
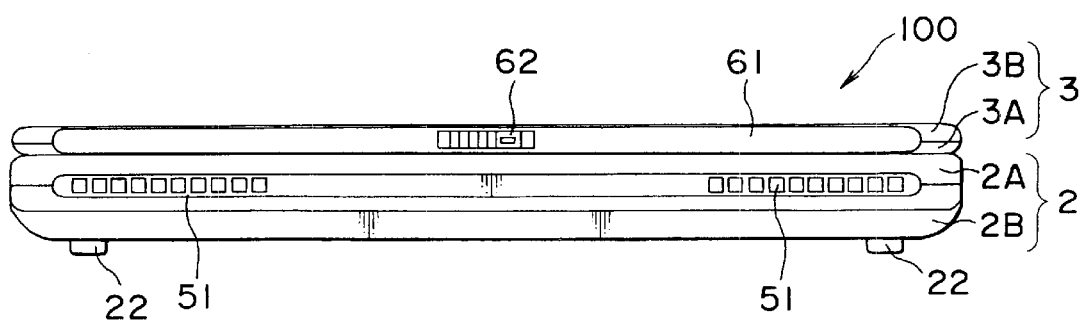
FIG. 5 is a front elevational view of the computer shown in FIG. 3.

As shown in FIGS. 1 and 5, a pair of speakers 51 is disposed on a front side of the main unit 2, and an antenna cover 61 covering an antenna and a slide lever 62 for releasing a tooth 32 projecting from the front surface of the display unit 3 from a hole 13 defined in the upper surface of the main unit 2 are disposed on a front side of the display unit 3.

Figure 6:
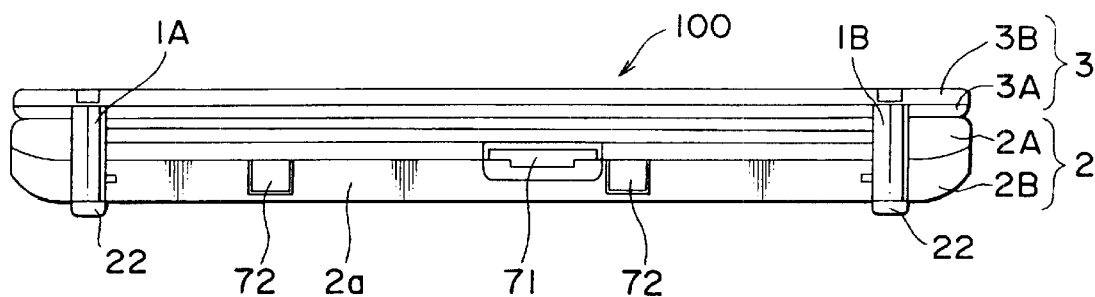
FIG. 6 is a rear elevational view of the computer shown in FIG. 3.

As shown in FIG. 6, battery connectors 71, 72 for electrically and mechanically connecting the battery pack are disposed in the battery storage region 2a in a rear side of the main unit 2.

Figure 7:
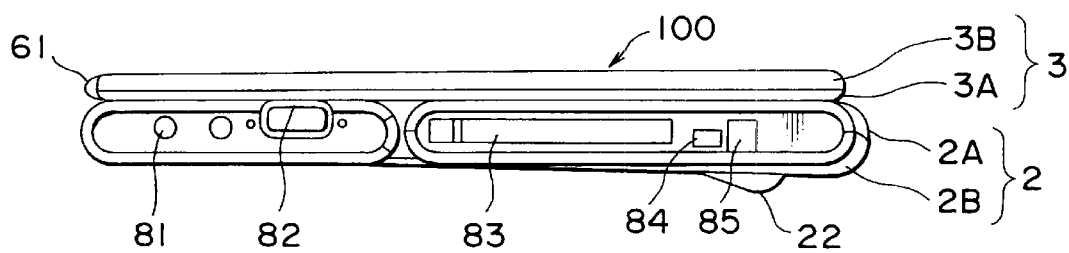
FIG. 7 is a right side elevational view of the computer shown in FIG. 3.

As shown in FIGS. 1 and 7, the main unit 2 has on its right side a headphone terminal 81, a jog dial 82, a PC card slot 83 for accommodating a PC (Personal Computer) card according to the PCMCIA (Personal Computer Memory Card International Association) standards, a 4-pin IEEE (Institute of Electrical and Electronics Engineers) 1394 terminal 84, and a modem terminal 85 for a modular jack.

The jog dial 82 has a side surface partly projecting from the right side of the main unit 2 and an upper surface partly projecting from the upper surface of the main unit 2 so as to lie flush with the keys of the keyboard 11.

The jog dial 82 is a user interface that can easily be operated to perform system settings and various functions of various software applications with ease by rotating and pressing the dial. As shown in FIGS. 1 and 2, the jog dial 82 has a flat disk-shaped control knob 82a which can be rotated in the direction indicated by the arrow a or b to execute certain processing and which can also be pressed in the direction indicated by the arrow c to execute certain processing.

Figure 8:
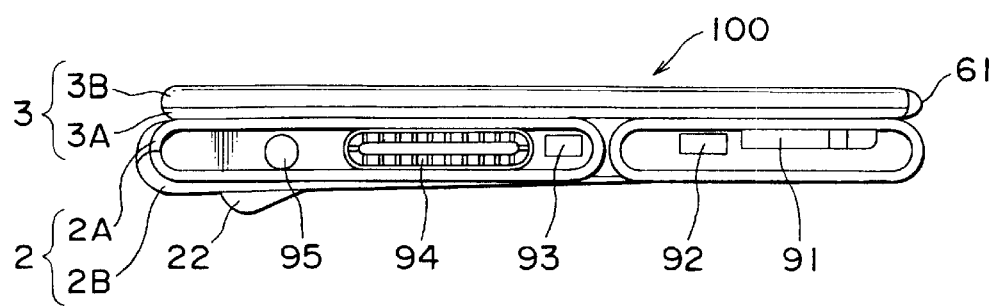
FIG. 8 is a left side elevational view of the computer shown in FIG. 3.

As shown in FIGS. 1 and 8, the main unit 2 has on its left side a memory stick slot 91 for a memory stick serving as a memory card, an USB (Universal Serial Bus) terminal 92, an external display connector 93, an air discharge hole 94, and an external power supply connector 95.

A transparent plate 14 is fitted in a portion of the upper surface of the main unit 2 which is aligned with the memory stick slot 91 for allowing the user to confirm the label of a memory stick, which has been inserted into the memory stick slot 91, from above the upper surface of the main unit 2 through the transparent plate 14.

Figure 9A:
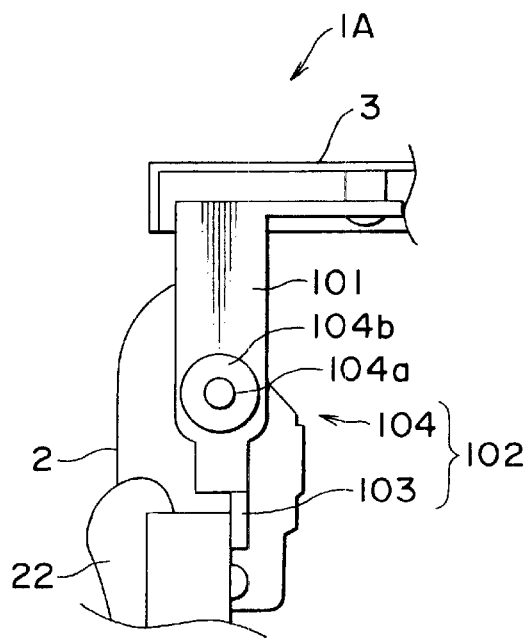
FIGS. 9A and 9B are side elevational and plan views showing details of a hinge (first opening and closing mechanism) of the computer shown in FIG. 1.
Figure 9B:
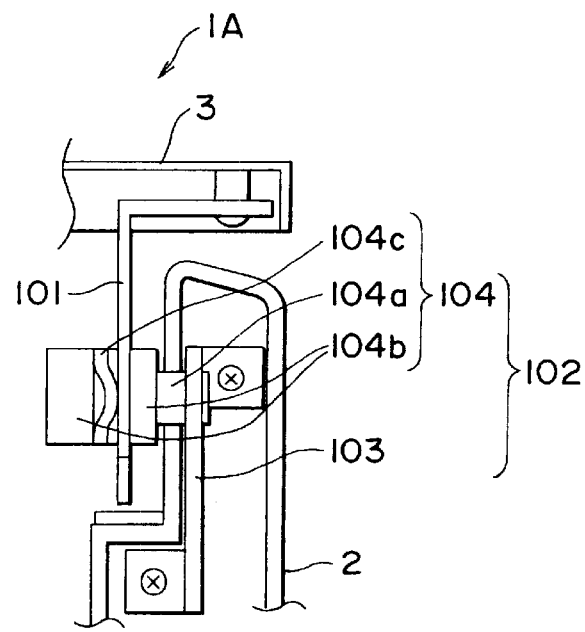

FIGS. 9A and 9B are left side elevational and plan views, respectively, showing details of the hinge (first opening and closing mechanism) 1A with the nonmetal casing 2A removed from the main unit 2 and the nonmetal casing 3B removed from the display unit 3.

The hinge 1A comprises a projection 101 fixed by a screw to a side end of the metal casing 3B of the display unit 3 so as to project substantially perpendicularly to the display panel of the LCD 31 of the display unit 3, and a support 102 fixed by a screw to a side end of the main unit 2. The projection 101 having a tip end portion is rotatably supported by the support 102.

The projection 101, which is substantially L-shaped, is made of a material of large mechanical strength, e.g., stainless steel (SUS) that is an iron-based material, in order to keep the display unit 3 strong when it is opened and closed. The projection 101 has an end fixed by a screw to a side end of the display unit 3 and an opposite end rotatably supported on the support 102.

The support 102 comprises a strength holder 103 which holds a mechanical strength and a joint 104 to which the projection 101 is joined. The strength holder 103, which is substantially L-shaped, is made of, a material of large mechanical strength, e.g., stainless steel (SUS) that is an iron-based material, in order to keep the display unit 2 strong when it is opened and closed and also to ensure opening and closing actions of the display unit 2. The joint 104 comprises a shaft 104a supported by the strength holder 103, and a stopper 104b and a washer spring 104c that are fitted over the shaft 104a. The opposite end of the projection 101 is fitted over the shaft 104a, and integrally joined thereto by the stopper 104b and the washer spring 104c.

Figure 10A:
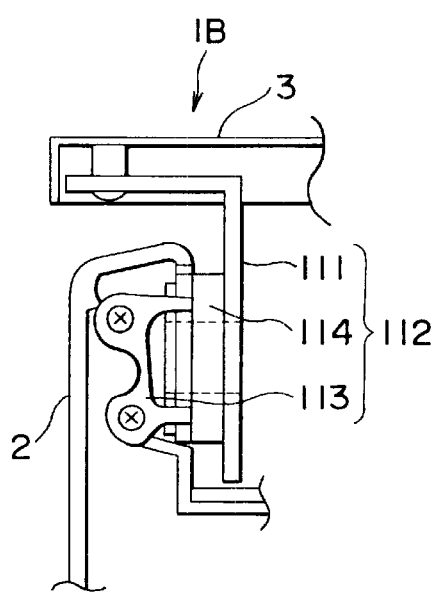
FIGS. 10A and 10B are side elevational and plan views showing details of a hinge (second opening and closing mechanism) of the computer shown in FIG. 1.
Figure 10B:
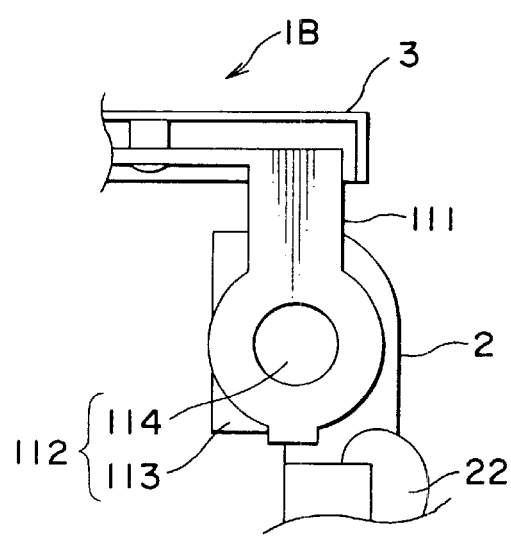

FIGS. 10A and 10B are plan and right side elevational views, respectively, showing details of the hinge 1B (second opening and closing mechanism) with the nonmetal casing 2A removed from the main unit 2 and the nonmetal casing 3B removed from the display unit 3.

The hinge 1B comprises a projection 111 fixed by a screw to the other side end of the display unit 3 so as to project substantially perpendicularly to the display panel of the LCD 31 of the display unit 3, and a support 112 fixed by a screw to the other side end of the main unit 2. The projection 111 having a tip end portion is rotatably supported by the support 112.

The projection 111 and the support 112 are substantially identical in structure to the projection 101 and the support 102 of the hinge 1A, but differ therefrom in that the support 112 has a joint 114 that is centrally hollow for passage of wires, etc.

The hinges 1A, 1B allow the projections 101, 111 to rotate in the direction indicated by the arrow R in FIG. 1 with respect to the supports 102, 112. Since the display unit 3 may be provided with only the projections 101, 111, a space within a lower portion of the display unit 3, i.e., a space below the LCD 31, can effectively be utilized.

FIGS. 11 through 14 are partly sectional side elevational views showing the manner in which the display unit 3 is opened with respect to the main unit 2 while the computer 100 with the battery pack mounted therein is placed on a desktop.

Figure 11:
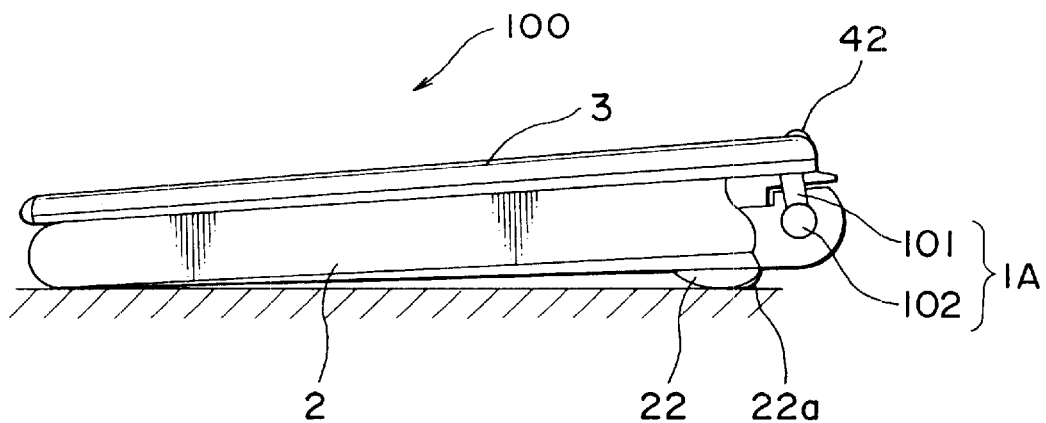
FIG. 11 is a first partly sectional side elevational view showing the manner in which the display unit is opened with respect to the main unit while the computer with the battery pack mounted therein as shown in FIG. 1 is placed on a desktop.

As shown in FIG. 11, when the computer 101 is placed on a desktop, for example, the rear portion of the computer 100 is raised higher than the front portion thereof by the legs 22, i.e., the computer 100 is tilted toward the user. The legs 22 have rubber sheets 22a, for example, applied to their bottoms, holding the computer 100 stable against slipping on the desktop.

Figure 12:
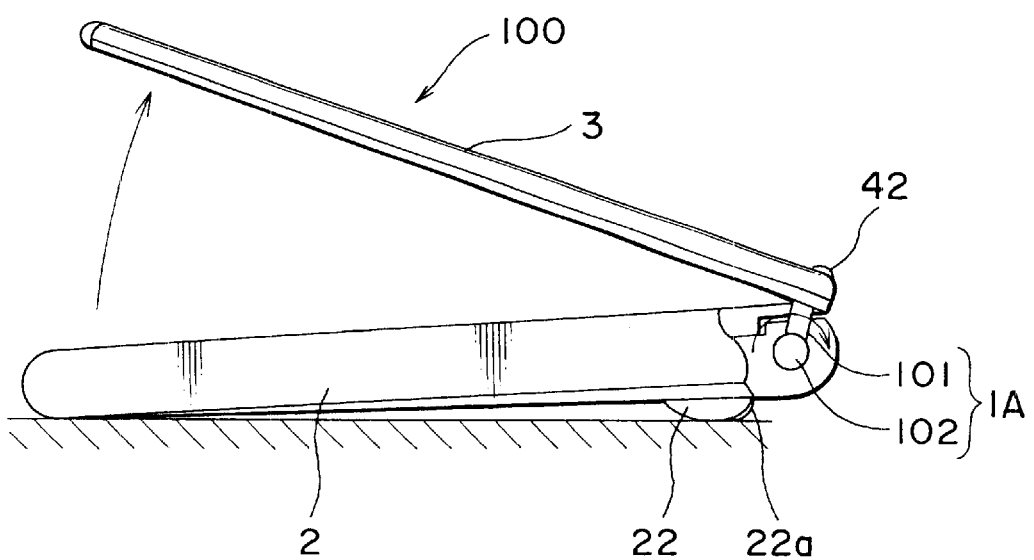
FIG. 12 is a second partly sectional side elevational view showing the manner in which the display unit is opened with respect to the main unit while the computer with the battery pack mounted therein as shown in FIG. 1 is placed on the desktop.

As shown in FIG. 12, the slide lever 62 is slid to slide the tooth 32 projecting from the front surface of the display unit 3 out of locking engagement with the hole 13 defined in the upper surface of the main unit 2, and the display unit 3 is unfolded from the main unit 2. At this time, since the rear portion of the display unit 3 is offset from the supports 102, 112 by the length of the projections 101, 111, the rear portion of the display unit 3 is turned along the rear portion of the main unit 2. As the rear portion of the main unit 2 is lifted off the surface of the desktop by the legs 22, even when the display unit 3 is opened more than 90 degrees from the main unit 2, the rear portion of the display unit 3 is not held in abutment against the surface of the desktop, allowing the display unit 3 to be unfolded smoothly.

Figure 13:
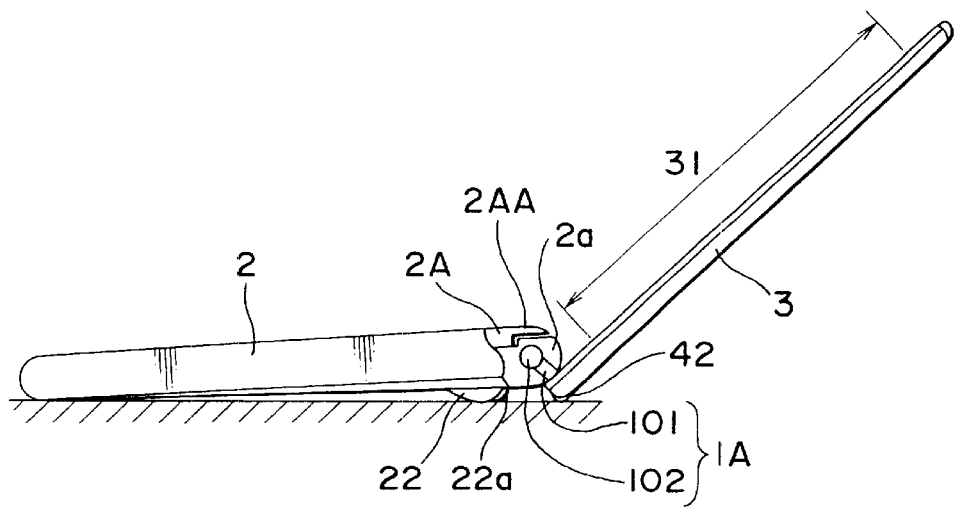
FIG. 13 is a third partly sectional side elevational view showing the manner in which the display unit is opened with respect to the main unit while the computer with the battery pack mounted therein as shown in FIG. 1 is placed on the desktop.
Figure 15:
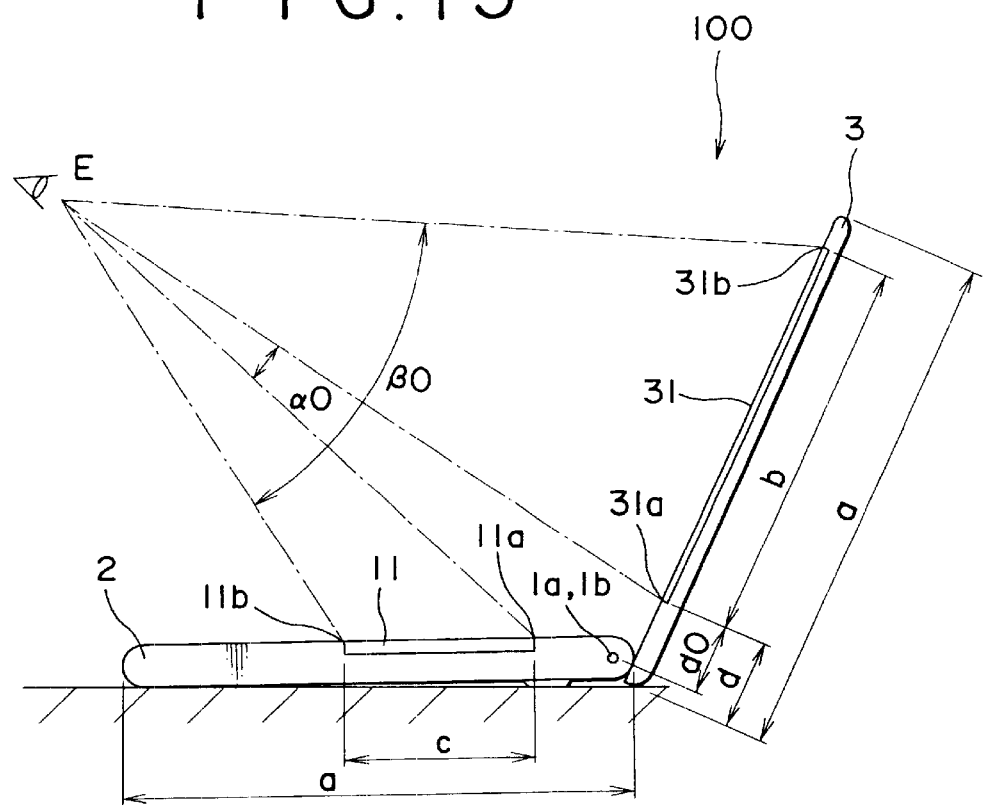
FIG. 15 is a side elevational view of the computer shown in FIG. 1 with the display unit opened with respect to the main unit.
Figure 31:
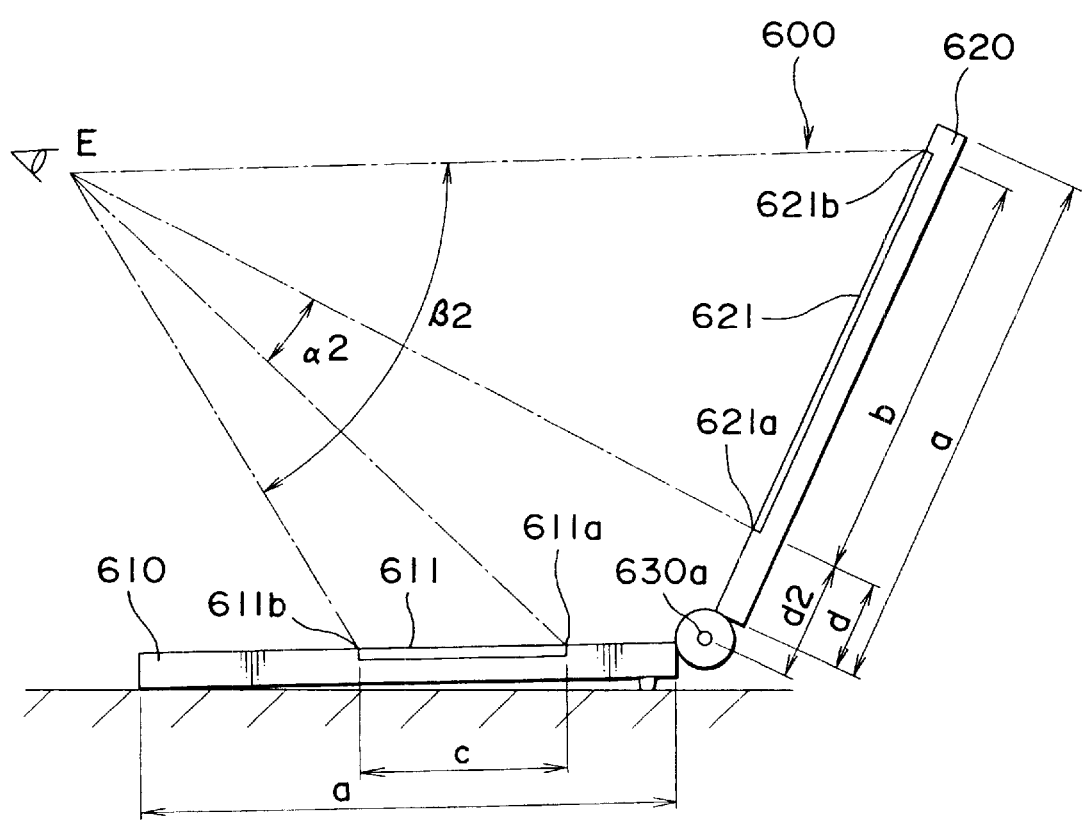
FIG. 31 is a side elevational view of the computer shown in FIG. 30.

As shown in FIG. 13, the display unit 3 is unfolded from the main unit 2 to an angular position in which the user can easily view the LCD 31 of the display unit 3. FIG. 15 is a side elevational view corresponding to the views of the conventional computers 500, 600 shown in FIGS. 29 and 31. In FIG. 15, the main unit 2 and the display unit 3 have the width a, the LCD 31 has the width b, the keyboard has the width c, and a region of the display unit 3 beneath the LCD 31 where a board can be housed has the distance d. Since the display unit 3 is arranged so as to be perpendicular to the projections 101, 111 that project radially from the central axes 1a, 1b of the hinges 1A, 1B disposed in the main unit 2, the rear portion of the display unit 3 is turned behind the main unit 2, bringing the LCD 31 closer to the keyboard 11. Stated otherwise, the distance do between the central axes 1a, 1b of the hinges 1A, 1B of the computer 100 and the lower end 31a of the LCD 31 becomes smaller than the distance d of the region of the display unit 3 beneath the LCD 31 where a board can be housed.

Therefore, an minimum angle α0 through which the user's line of sight to the computer 100 moves, i.e., angles formed at the viewpoint E between the upper end 11a of the keyboard 11 and the lower end 31a of the LCD 31, and a maximum angle β0 through which the user's line of sight to the computer 100 moves, i.e., an angle formed at the viewpoint E between the lower end 11b of the keyboard 11 and the upper end 31b of the LCD 31 are smaller than the minimum angles α1, α2 through which the user's line of sight moves and the maximum angles β1, β2 through which the user's line of sight moves with respect to the conventional computers 500, 600. Therefore, since the user's eyes need to move a shorter distance, the user is less liable to fatigue from use over a long period of time, and the efficiency with which to work with the computer increases.

Figure 14:
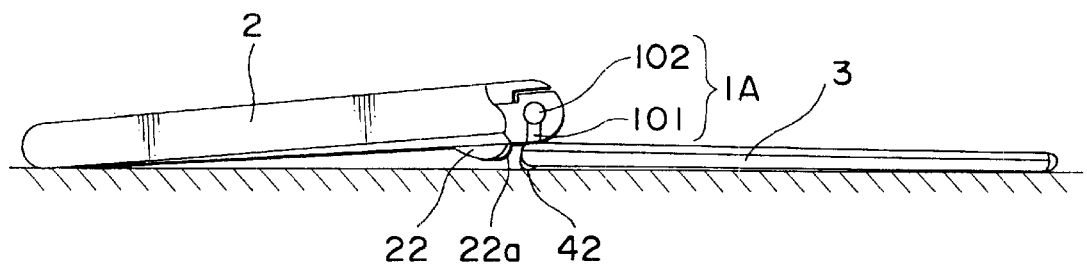
FIG. 14 is a fourth partly sectional side elevational view showing the manner in which the display unit is opened with respect to the main unit while the computer with the battery pack mounted therein as shown in FIG. 1 is placed on the desktop.

As shown in FIG. 14, as the display unit 3 is further unfolded from the main unit 2, the display unit 3 and the main unit 2 can be held substantially horizontally. At this time, inasmuch as the protectors 42 slightly projecting from the rear portion of the display unit 3 protect the rear portion of the display unit 3, the rear portion of the display unit 3 is prevented from being scratched from frictional engagement with the surface of the desktop.

Figure 16:
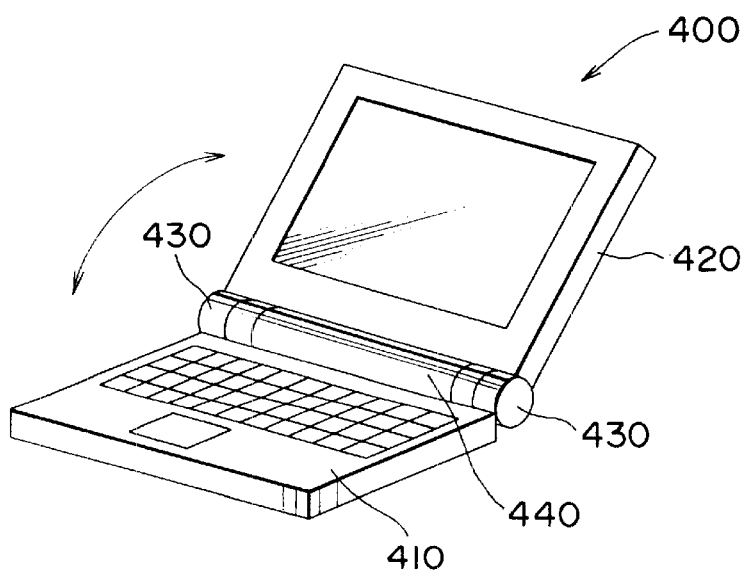
FIG. 16 is a perspective view showing a computer as a conventional information processing device with a display unit opened with respect to a main unit.
Figure 17:
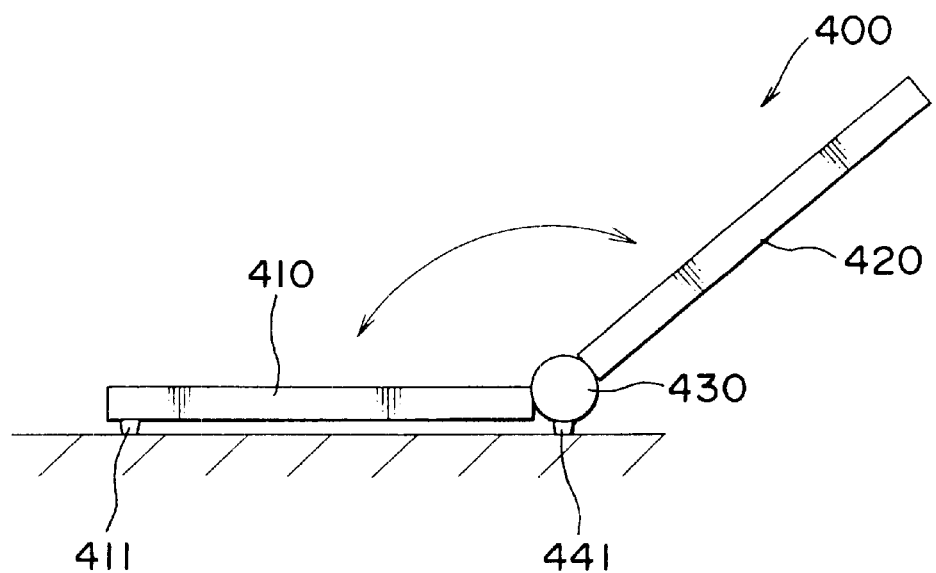
FIG. 17 is a side elevational view of the computer shown in FIG. 16.

The computer 100 of the above construction further offers the following advantages:

FIG. 16 is a perspective view showing a computer as a conventional information processing device with a display unit opened with respect to a main unit, and FIG. 17 is a side elevational view of the computer. The computer, denoted by 400, has a display unit 420 openably and closably attached to a main unit 410 by a pair of hinges 430. A battery pack 440 is removably disposed between the hinges 430.

The computer 400 is spaced from the surface of a desktop by a leg 411 mounted on the lower surface of a front portion of the main unit 410, and a leg 441 mounted on the lower surface of the battery pack 440. Air for cooling electronic parts in the computer is introduced from an air inlet hole, not shown, defined in the lower surface of the main unit 410.

Figure 18:
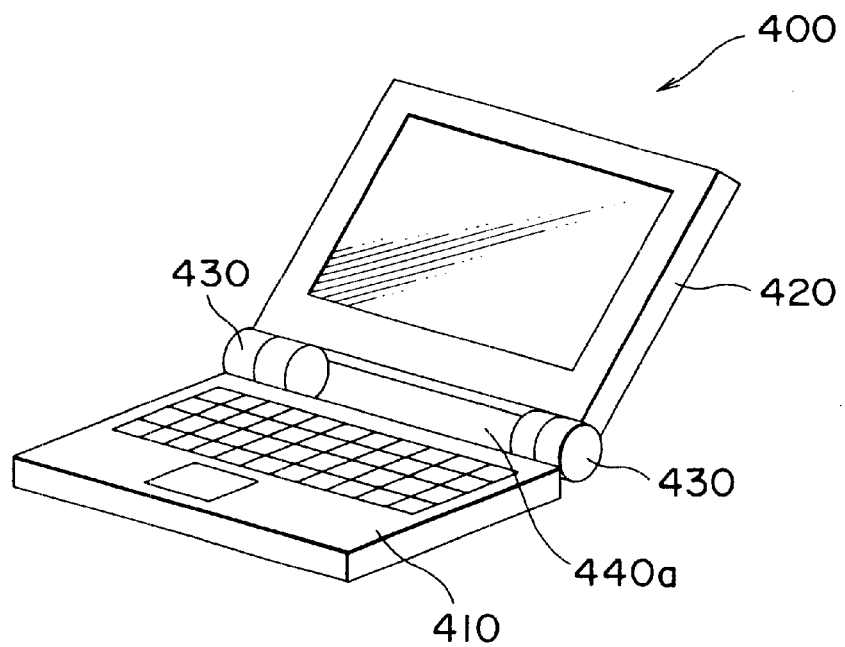
FIG. 18 is a perspective view illustrative of problems of the computer shown in FIG. 16.

When the conventional computer 400 is displayed for sale with the display unit 420 opened with respect to the main unit 410, the battery pack 440 is usually removed for theft prevention. However, since the lower end of the display unit 420 is opened and closed along the outer circumference of the hinges 430, as shown in FIG. 18, a hole 440a from which the battery pack 440 is removed is left between the main unit 410 and the display unit 420, making the computer 400 unsightly in appearance.

With the computer 100 according to the present embodiment, however, as shown in FIG. 13, the battery storage region 2a from which the battery pack has been removed is concealed by an extension 2AA of the nonmetal casing 2A made of plastics or the like which covers the upper surface of the main unit 2. Therefore, no hole is left for view, making the computer 100 sightly in appearance.

When the battery pack 440 is removed from the computer 400 and the computer 400 is used with an AC power supply, as shown in FIG. 19, the computer 400 is supported by the leg 411 on the lower surface of the front portion of the main unit 410 and the lower surface of the rear portion of the main unit 410. Therefore, the air inlet hole defined in the lower surface of the main unit 410 is partly closed by the surface of the desktop, making it impossible to sufficiently cool the electronic parts in the computer 400.

With the computer 100 according to the present embodiment, however, as shown in FIG. 13, when the battery pack is removed from the computer 100 and the computer 100 is used with an AC power supply, the air inlet hole 21 defined in the lower surface remains spaced from the surface of the desktop by the legs 22 on the main unit 2. As the air inlet hole 21 is not closed, electronic parts in the computer 100 can sufficiently be cooled.

With the conventional computer 400, as shown in FIG. 19, since the main unit 410 is tilted downwardly toward the display unit 420, the computer 400 tends to turn over toward the unfolded display unit 420. Therefore, the display unit 420 cannot be opened and closed smoothly.

With the computer 100 according to the present embodiment, however, as shown in FIG. 13, the legs 22 support the computer 100 even when no battery pack is mounted in the computer 100. Therefore, the main unit 2 is stably held on the surface of the desktop, and the display unit 3 can be opened and closed when the battery pack is not mounted in the same manner as when the battery pack is mounted in place.

Figure 20:
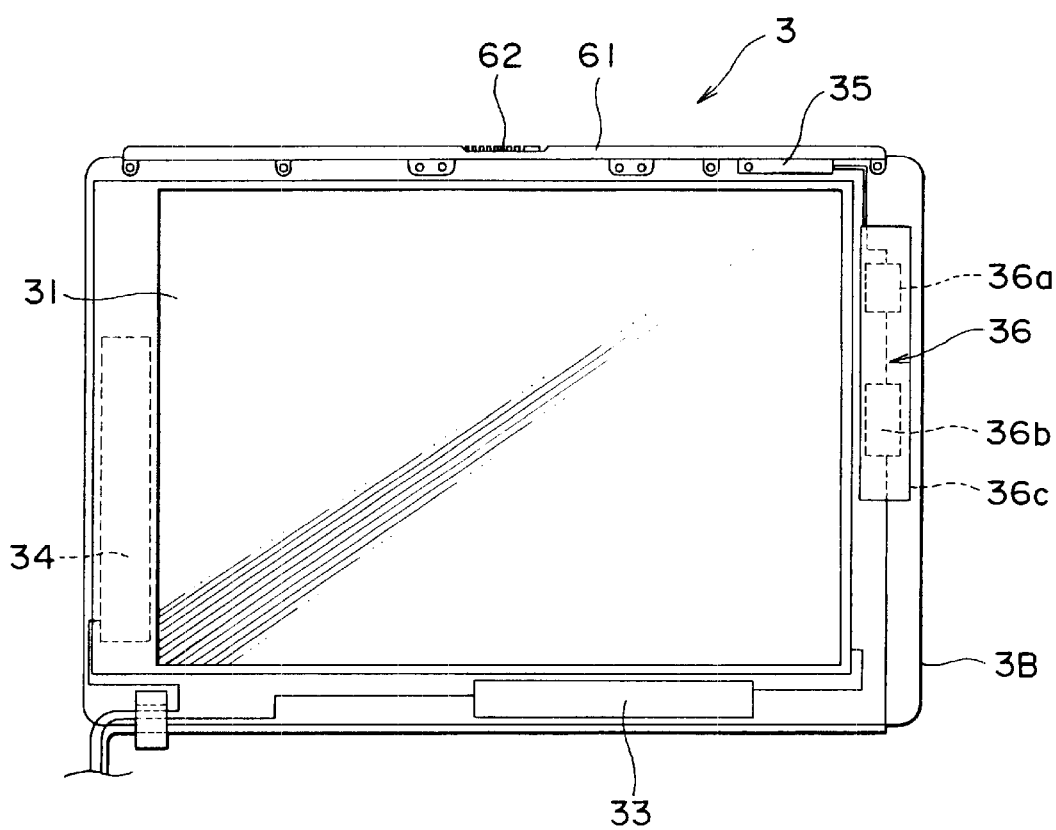
FIG. 20 is a view showing an internal structure of the display unit at the time a nonmetal casing covering the front surface of the display unit is detached.

FIG. 20 is a view showing an internal structure of the display unit 3 at the time the nonmetal casing 3A covering the front surface of the display unit 3 is detached.

A light source circuit (inverter circuit) 33 for the LCD 31 is disposed beneath the LCD 31. A driver circuit 34 for the LCD 31 is disposed on a left side of the LCD 31. An antenna module 35 is disposed upwardly of the LCD 31. A transmission/reception module 36 is disposed on a right side of the LCD 31.

As described above, only the projections 101, 111 of the hinges 1A, 1B need to be provided on the display unit 3 side. Therefore, a space within a lower portion of the display unit 3, i.e., a space below the LCD 31, can effectively be utilized. Heretofore, a light source circuit (inverter circuit) has been disposed on the right side of the LCD. In the present embodiment, the light source circuit (inverter circuit) 33 for the LCD 31 is disposed beneath the LCD 31, the transmission/reception module 36 is disposed on the right side of the LCD 31, and the antenna module 35 is disposed upwardly of the LCD 31 in the vicinity of the transmission/reception module 36 preferably from a sensitivity viewpoint for compatibility with Bluetooth.

Bluetooth (hereinafter referred to as BT) refers to close-range wireless communication technology whose standardization was started in May 1998 by five Japanese, European, and U.S. companies. According to the BT process, a maximum data transmission rate is 1 Mbits/second (effectively, 721 kbits/second), and a maximum transmission range is 10 m. 79 channels having a bandwidth of 1 MHz are established in a 2.4 GHz ISM (Industrial Scientific) band that can be used by users without licenses, and radio waves are transmitted according to a frequency-hopping spread spectrum process where channels are switched 1600 times per second.

BT-compatible devices are divided into master units for determining a frequency hopping pattern and slave units to communicate with master units. A master unit can communicate with seven slave units at one time. A subnet that is composed of a maximum of 8 master and slave units is called a piconet. Slaves of a piconet can simultaneously become slave units of two or more piconets.

Figure 21A:
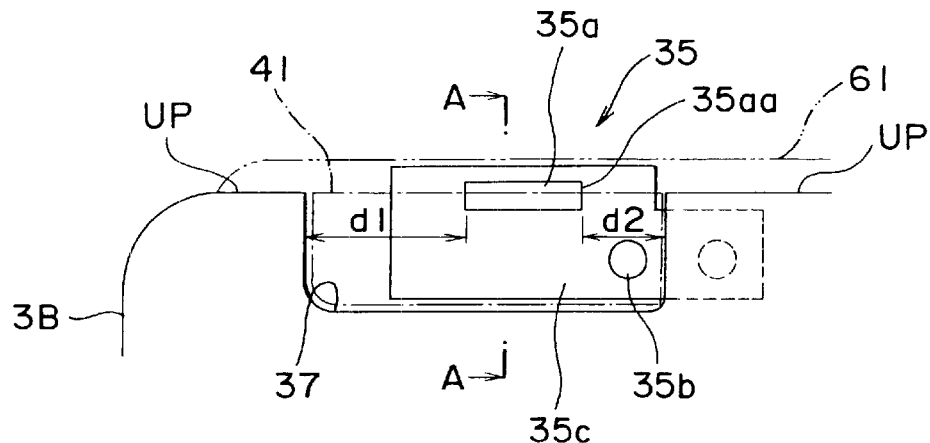
FIGS. 21A, 21B, and 21C are a view of an antenna module shown in FIG. 1 and surrounding areas as seen from the outside of the display unit, a view thereof as seen from the inside of the display unit, and a cross-sectional view taken along line A—A of FIG. 21A.
Figure 21B:
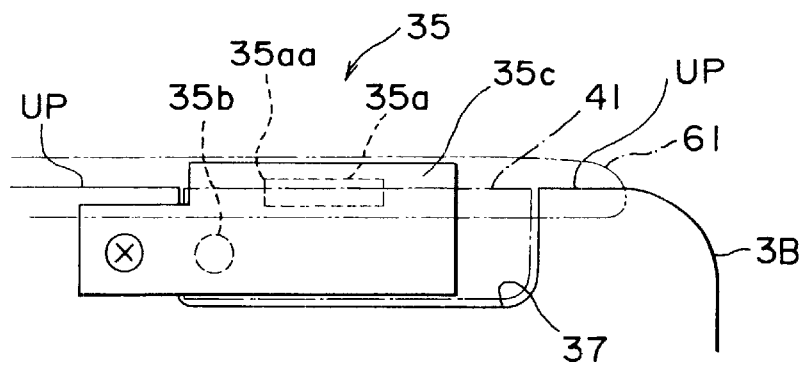
Figure 21C:
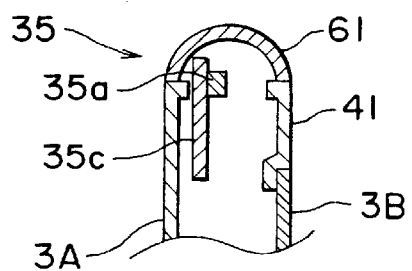

FIGS. 21A, 21B, and 21C are a view of the antenna module 35 and surrounding areas as seen from the rear side of the display unit 3, a view thereof as seen from the front side of the display unit 3, and a cross-sectional view taken along line A—A of FIG. 21A.

The antenna module 35 comprises a BT antenna 35a for BT communications and a connector 35b for connection to the transmission/reception module 36, the BT antenna 35a and the connector 35b being installed on a board 35c.

The antenna module 35 is incorporated in the display unit 3 for portability and aesthetic reasons. The rear side of the display unit 3 is covered with the metal casing 3B. If the BT antenna 35a were fully covered with the metal casing 3B, it would impair the transmission and reception of radio waves. Therefore, the antenna module 35 is disposed such that the BT antenna 35a is positioned above the display unit 3 and slightly projects upwardly from an upper end UP of the metal casing 3B, and the antenna module 35 including the projection of the BT antenna 35a is covered with an antenna cover 61 which comprises a nonmetal member made of plastics or the like. The antenna module 35 may be disposed such that the BT antenna 35a projects as a whole upwardly from the upper end of the metal casing 3B. The BT antenna 35a thus projecting upwardly provides improved radio wave transmission/reception characteristics on the left and right sides of the display unit.

The metal casing 3B has a recess 37 wherein the antenna module 35 is disposed for increased sensitivity of the BT antenna 35a. The recess 37 is defined such that the distance d1 between a left end of the recess 37 shown in FIG. 21A and a high-sensitivity side of the BT antenna 35a, i.e., an end of the BT antenna 35a opposite to a feeder port 35aa thereof, is greater than the distance d2 between a right end of the recess 37 shown in FIG. 21A and the feeder port 35aa of the BT antenna 35a. The recess 37 is covered with an antenna cover 41 which comprises a nonmetal member made of plastics or the like.

The BT antenna 35a on the board 35c in the antenna module 35 is directed outwardly of the display unit 3, as shown in FIG. 21C. However, the BT antenna 35a on the board 35c may be directed inwardly of the display unit 3.

As shown in FIG. 20, the transmission/reception module 36 comprises an RF processor 36a connected to the connector 35b which is electrically connected to the feeder port 35aa of the antenna module 35, and a baseband processor 36b connected to a microcomputer in the main unit 2, the RF processor 36a and the baseband processor 36b being mounted on a board 36c.

Transmission data to be transmitted via BT communications is generated by the microcomputer and transferred to the baseband processor 36b. The baseband processor 36b converts the transmission data from the microcomputer into packets for BT communications. At this time, the baseband processor 36b adds code detecting and correcting codes and various communication data to the converted data. The data generated by the baseband processor 36b is transferred to the RF processor 36a, which converts the data into analog data for transmission.

The RF processor 36a modulates the transferred digital data, and transmits on a radio wave carrier in the 2.4 GHz band from the BT antenna 35a. The radio wave carrier has a frequency selected for a different slot (one lump of date) by a frequency hopping process.

A signal received by the BT antenna 35a is demodulated and converted into digital data by the RF processor 36a. Thereafter, the data is checked for errors by the baseband processor 36b. Then, the data is transferred to the microcomputer, which performs corresponding processing on the data.

Figure 22A:
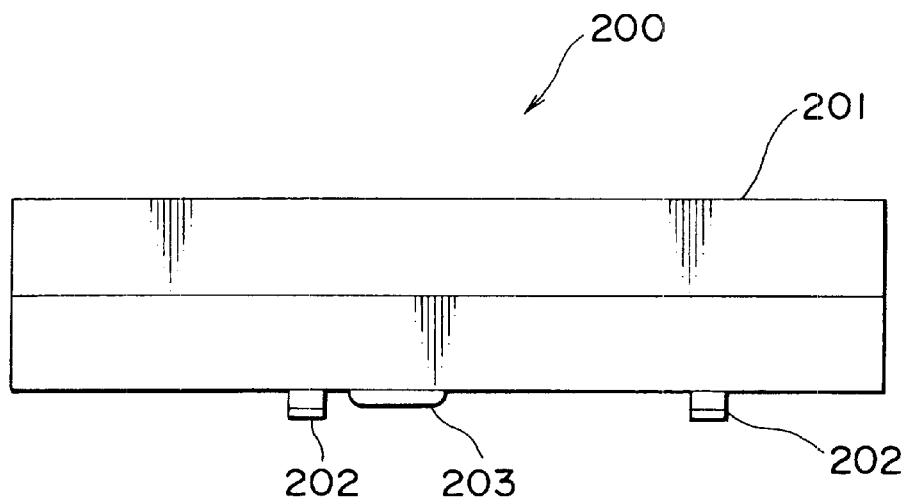
FIGS. 22A, 22B, and 22C are a plan view of a battery pack of the computer shown in FIG. 1, a side elevational view of the battery pack, and a right side elevational view of the battery pack.
Figure 22B:
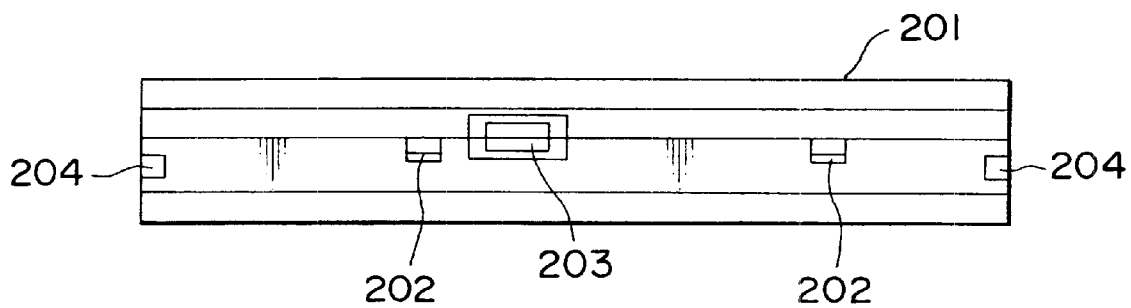
Figure 22C:
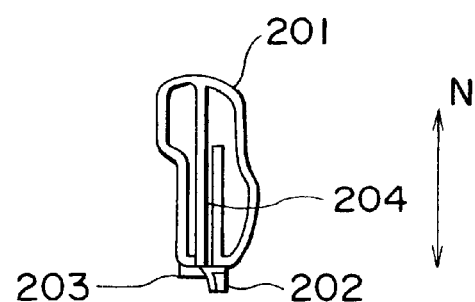

FIGS. 22A, 22B, and 22C are a plan view of the battery pack, a side elevational view of the battery pack, and a right side elevational view of the battery pack. The battery pack, denoted by 200, comprises a lithium-ion secondary cell housed in a case 201. Since the space is provided in front of the air inlet hole 21 defined in the lower surface of the main unit 2, as described above, the battery storage region 2a in the main unit 2 is of a size that can be at least twice the size of the conventional battery storage region. Therefore, the case 201 can be of a size which is at least twice the size of the conventional case, and is molded of plastics, for example. The case 201 can thus hold a plurality of cells at least twice as many as the cells in the conventional case, e.g. two arrays of cells as compared with one array of cells in the conventional case.

The battery pack 200 is inserted by being guided between the hinges 1A, 1B, and is mechanically and electrically connected to the main unit 2. The battery pack 200 and the main unit 2 have a guide mechanism and a connection mechanism which allow the battery pack 200 to be detachably placed in the main unit 2.

Specifically, as shown in FIGS. 22A to 22C and 23, the case 201 has a pair of attachments 202, an electric connection terminal 203, and a pair of grooves 204 on its outer surfaces. The attachments 202 project from a surface of the case 201 for abutment against the main unit 2. The electric connection terminal 203 projects from the surface of the case 201 for abutment against the main unit 2 and is positioned between the attachments 202. The grooves 204 are defined in left and right ends of the case 201 and extend in a horizontal direction N.

Figure 23:
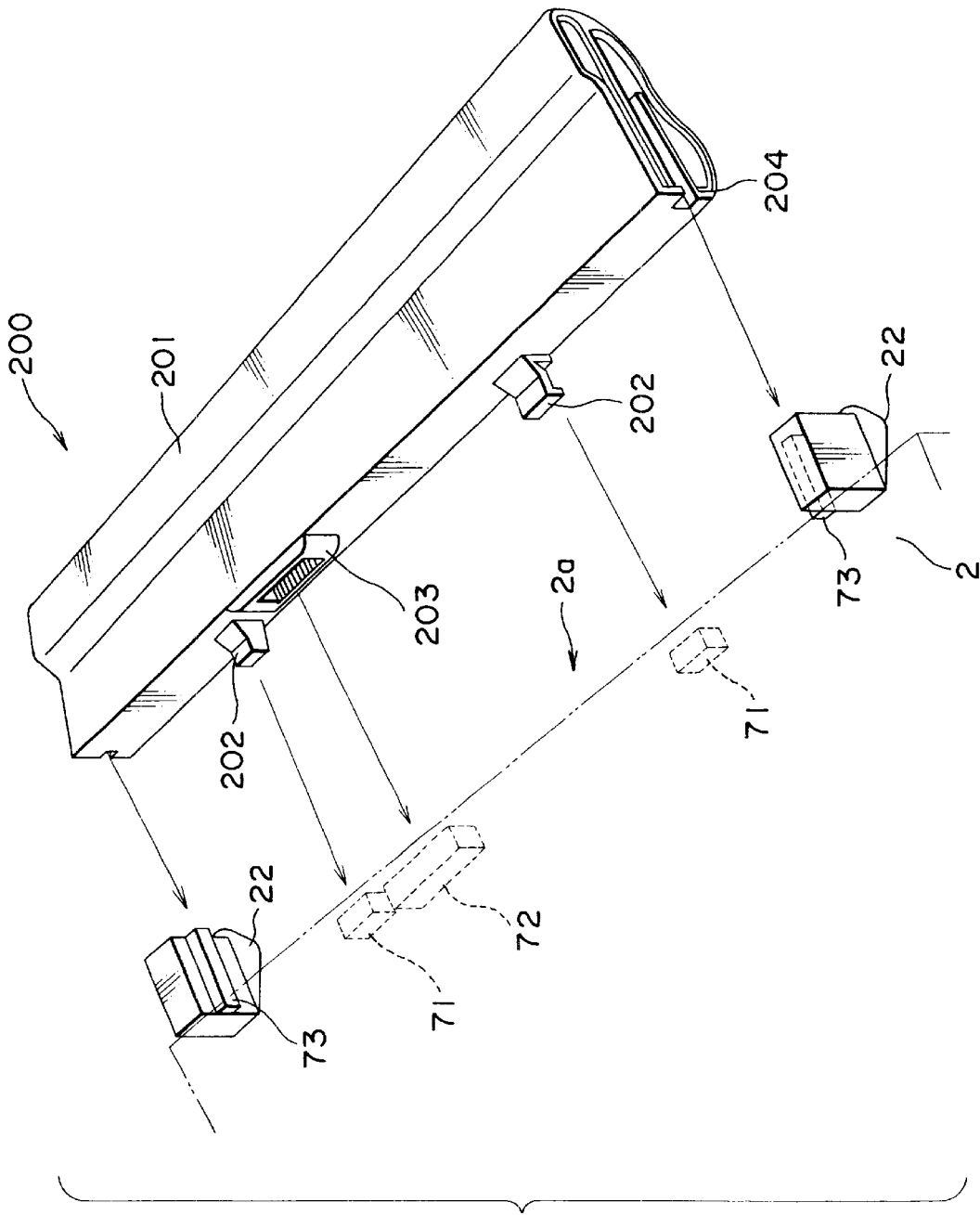
FIG. 23 is a perspective view of the battery pack of the computer shown in FIG. 1.

As shown in FIG. 23, battery connectors 71, 72 in the form of recesses, which correspond respectively to the attachments 202 and the electric connection terminal 203, are defined in a rear end portion of the battery storage region 2a in the main unit 2. A pair of projections 73 for insertion into the respective grooves 204 is defined in the battery storage region 2a at the opposite sides of the rear end portion thereof, substantially in the upper surface of the legs 22.

Figure 24:
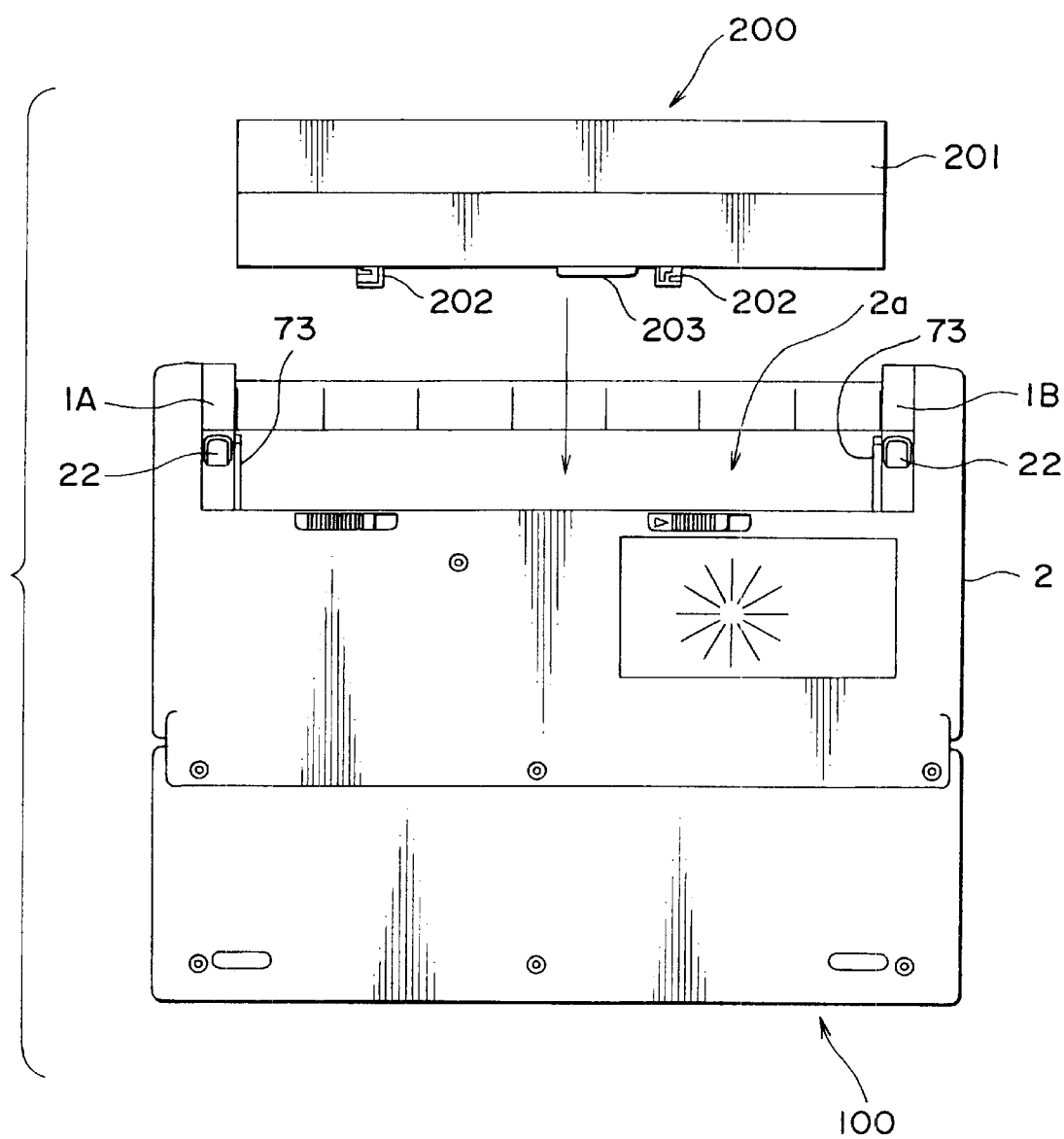
FIG. 24 is a plan view of the computer shown in FIG. 1 before the battery pack is inserted therein.
Figure 26:
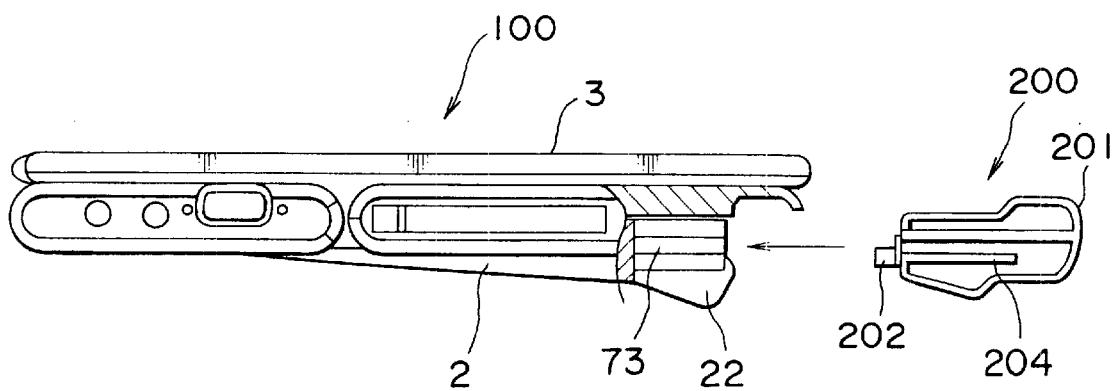
FIG. 26 is a side elevational view of the computer shown in FIG. 1 before the battery pack is inserted therein.

As shown in FIGS. 24 and 26, the battery pack 200 is moved toward the battery storage region 2a while an abutment surface of the battery pack 200 is being oriented toward the battery storage region 2a, and the projections 73 of the main unit 2 are inserted respectively into the grooves 204 in the battery pack 200. The battery pack 200 can thus be displaced horizontally in the battery storage region 2a along the projections 73.

Figure 25:
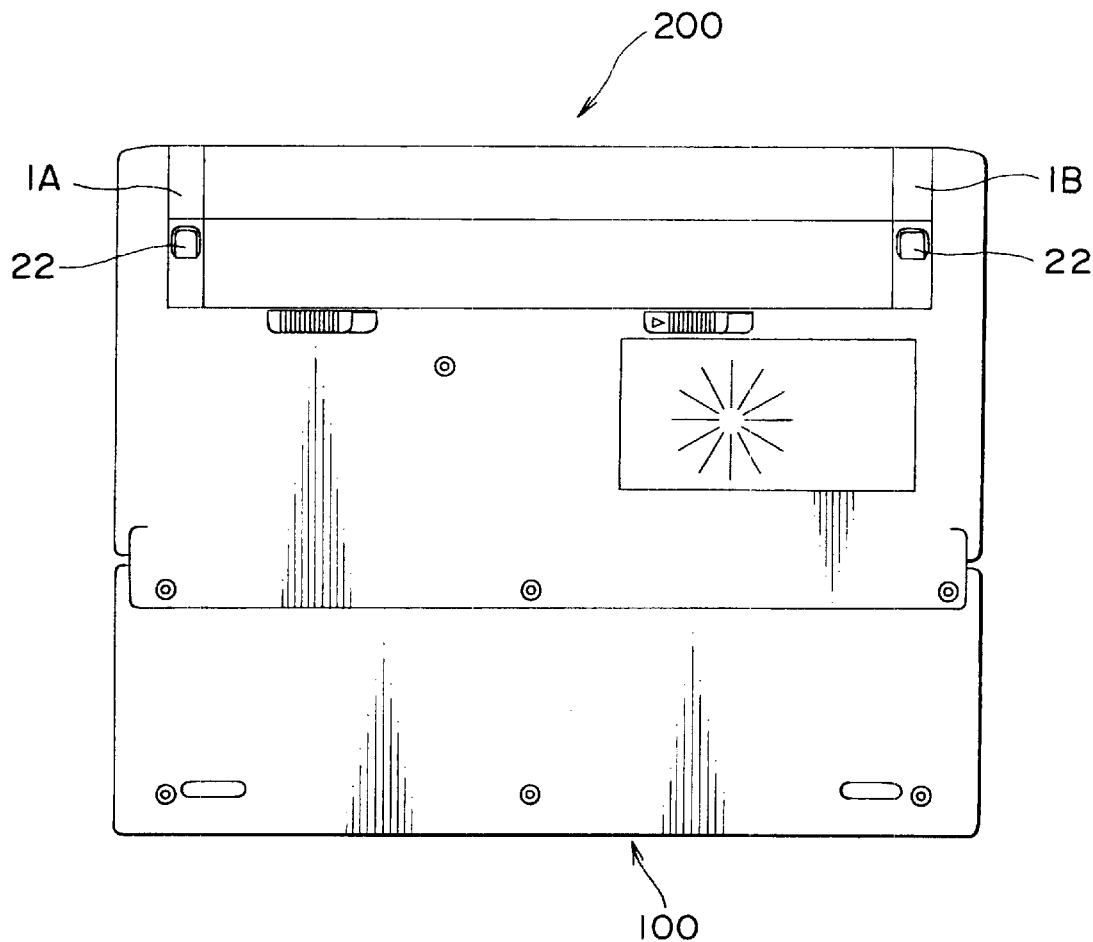
FIG. 25 is a plan view of the computer shown in FIG. 1 after the battery pack is inserted therein.
Figure 27:
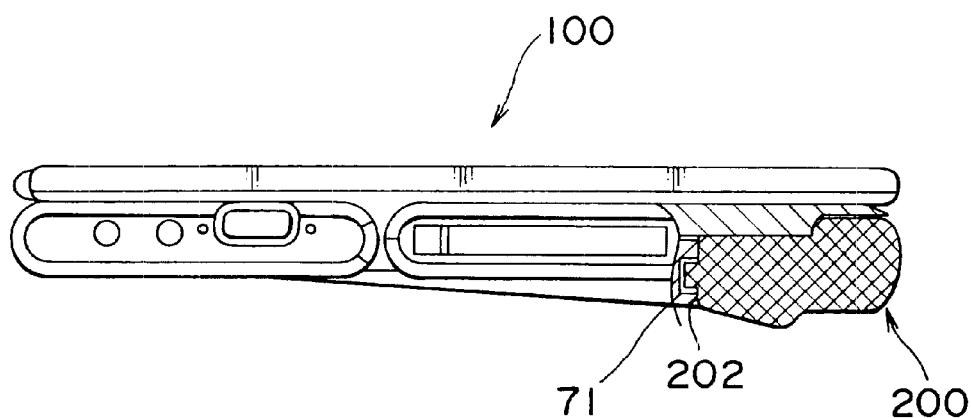
FIG. 27 is a side elevational view of the computer shown in FIG. 1 after the battery pack is inserted therein.
Figure 28:
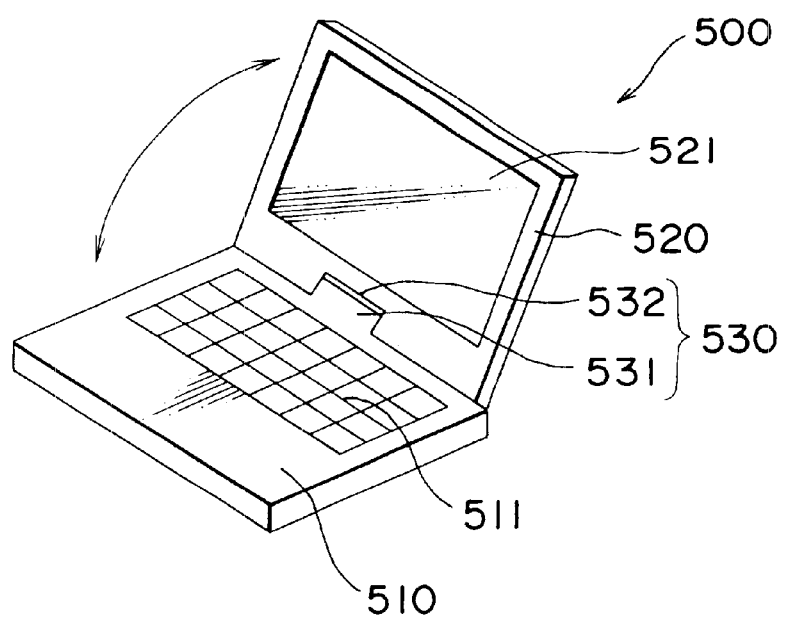
FIG. 28 is a perspective view of a computer as a conventional information processing device with a display unit opened with respect to a main unit.

As shown in FIGS. 25 and 27, the attachments 202 and the electric connection terminal 203 of the battery pack 200 are fitted into the battery connectors 71, 72 of the main unit 2. The battery pack 200 is now reliably electrically and mechanically removably fixed in position.

Since the battery pack 200 can be guided by the grooves 204 and the projections 73, the electric connection terminal 203 of the battery pack 200 is prevented from being damaged under stresses exerted when the electric connection terminal 203 is connected to and disconnected from the battery connector 72. With the battery pack 200 mounted in the main unit 2, a drive power supply is supplied from the battery pack 200 via the electric connection terminal 203 and the battery connector 72 to the main unit 2.

The guide mechanism described above comprises the grooves 204 defined in the opposite ends of the battery pack 200 and the projections 73 disposed on the surfaces of the main unit 2 which face the opposite ends of the battery pack 200. However, the grooves 204 and the projections 73 may positionally be switched around. Specifically, grooves similar to the grooves 204 may be defined in the surfaces of the main unit 2 which face the opposite ends of the battery pack 200, and projections similar to the projections 73 may be disposed on the opposite ends of the battery pack 200.

In the above embodiment, recesses are defined in the metal casing. However, the metal casing may be replaced with a nonmetal casing with an electromagnetic shield layer deposited on its inner surface. Such an electromagnetic shield layer may be deposited by an electrically conductive coating process, a metal plating process, a metal evaporating process, or a metal foil spreading process. While the above embodiment has been directed to a portable personal computer, the present invention is also applicable to any of various other types of information processing devices, e.g., portable information terminals and information processing devices such as portable telephone sets, radio units, etc.

Although a certain preferred embodiment of the present invention have been shown and described in detail, it should be understood that various changes and modifications may be made therein without departing from the scope of the appended claims.

What is claimed is:

1. An information processing device having a main unit for executing a predetermined information processing operation and a display unit openable and closable with respect to said main unit, comprising:
    a pair of projections joined to said display unit and angularly movable about an axis which is disposed in a position vertically spaced a predetermined distance from a display panel of said display unit;
    a pair of supports, said projections being angularly movably supported by said supports such that said axis is positioned within said main unit;
    a storage region provided in said main unit between said pair of supports for storing a battery therein;
    a pair of legs projecting from a lower surface of said main unit at opposite ends of said storing region.

2. An information processing device according to claim 1, wherein said projections are supported such that said display unit is openable and closable in an angular range of 180 degrees or more with respect to said main unit.

3. An information processing device according to claim 1, further comprising:
    a liquid crystal display member mounted on said display unit for displaying a desired image; and
    a light source circuit for said liquid crystal display member, disposed between said pair of projections.

4. An information processing device according to claim 1, further comprising:
    a battery having a portion projecting from the lower surface of said main unit and shaped to match the shape of said legs.

5. An information processing device having a main unit for executing a predetermined information processing operation and a display unit openable and closable with respect to said main unit, comprising:
    a pair of legs projecting from a lower surface of said main unit at opposite ends of a storage region whereby said legs include means for engaging a battery to be inserted into/removed from said main body.

6. An information processing device according to claim 5, wherein said battery has a portion thereof projecting from said lower surface of said main unit and is shaped to match the shape of said legs.

* * * * *